US012194428B2

(12) United States Patent
Chen et al.

(10) Patent No.: US 12,194,428 B2
(45) Date of Patent: Jan. 14, 2025

(54) MULTI-LAYERED MICRO-CHANNEL MIXER AND METHOD FOR MIXING FLUIDS

(71) Applicant: Fudan University, Shanghai (CN)

(72) Inventors: Fener Chen, Shanghai (CN); Dang Cheng, Shanghai (CN); Minjie Liu, Shanghai (CN); Huashan Huang, Shanghai (CN); Meifen Jiang, Shanghai (CN); Jiaqi Wang, Shanghai (CN)

(73) Assignee: Fudan University, Shanghai (CN)

( * ) Notice: Subject to any disclaimer, the term of this patent is extended or adjusted under 35 U.S.C. 154(b) by 701 days.

(21) Appl. No.: 17/467,377

(22) Filed: Sep. 6, 2021

(65) Prior Publication Data

US 2021/0394141 A1 Dec. 23, 2021

(30) Foreign Application Priority Data

Sep. 16, 2020 (CN) ........................ 202010975520.X

(51) Int. Cl.
*B01F 35/00* (2022.01)
*B01F 33/30* (2022.01)
*B01F 35/53* (2022.01)

(52) U.S. Cl.
CPC .......... *B01F 35/5312* (2022.01); *B01F 33/30* (2022.01); *B01F 2215/0422* (2013.01); (Continued)

(58) Field of Classification Search
CPC .................. B01F 35/5312; B01F 33/30; B01F 2215/0422; B01F 2215/0427; B01F 2215/0431
See application file for complete search history.

(56) References Cited

U.S. PATENT DOCUMENTS 7,718,420 B2 5/2010 Kim et al.
7,939,033 B2 5/2011 Lavric et al.
(Continued)

FOREIGN PATENT DOCUMENTS

CN 1537029 A 10/2004
CN 1915480 A 2/2007
(Continued)

OTHER PUBLICATIONS

W .Enrfeld , V .Hessel , H .Lowe , Microreactors: New Technology for Modern Chemistry , Wiley VCH ,Weinheim , Germany ,2000.
(Continued)

*Primary Examiner* — Anshu Bhatia

(57) ABSTRACT

A multi-layered micro-channel mixer includes a base plate and a cover plate. Two inlet fluid reservoirs, two inlet channels, two groups of fluid distribution channel networks, two groups of process fluid channels, an impinging stream mixing chamber, a fluid mixing intensification channel and an outlet buffer reservoir are provided on the base plate. Two fluids are fed into the two inlet fluid reservoirs, respectively. The fluids then flow into the process fluid channels via the inlet channels and the multi-stage fluid distribution channel networks, respectively. Then the two fluid streams ejected from the opposing process fluid channels impinges upon each other in the impinging stream mixing chamber. The mixed fluid is subjected to vortex or secondary flow generated by the baffles or the internals in the impinging stream mixing chamber and fluid mixing intensification channel, and finally the mixed fluid is discharged through the outlet buffer reservoir.

11 Claims, 4 Drawing Sheets

(52) U.S. Cl.
CPC ................. *B01F 2215/0427* (2013.01); *B01F 2215/0431* (2013.01)

(56) References Cited

U.S. PATENT DOCUMENTS

| | | | | |
|---|---|---|---|---|
| 2006/0283980 | A1 | 12/2006 | Wang | |
| 2007/0007204 | A1 * | 1/2007 | Schanz | B01F 35/561 422/258 |
| 2009/0311143 | A1 | 12/2009 | Lee et al. | |
| 2019/0284053 | A1 * | 9/2019 | Kim | B01F 33/30 |
| 2020/0397696 | A1 * | 12/2020 | Panagiotou | B01F 35/7176 |

FOREIGN PATENT DOCUMENTS

| | | | |
|---|---|---|---|
| CN | 101084061 | A | 12/2007 |
| CN | 101733056 | A | 6/2010 |
| CN | 101873890 | B | 7/2013 |
| CN | 103748791 | A | 4/2014 |
| CN | 105664773 | A | 6/2016 |
| CN | 207951405 | U | 10/2018 |
| CN | 210906104 | U | 7/2020 |
| CN | 211098962 | U | 7/2020 |
| WO | 0188525 | A1 | 11/2001 |
| WO | 03098218 | A1 | 11/2003 |
| WO | 2004012852 | A1 | 2/2004 |
| WO | 2009009129 | A1 | 1/2009 |
| WO | 2016141033 | A1 | 9/2016 |

OTHER PUBLICATIONS

Hessel V , H Löwe, A Müller, et al. Chemical Micro Process Engineering[M]. Wiley-VCH, 2004.

J Koryta. Diffusion. Mass Transfer in Fluid Systems : E.L. Cussler. Cambridge University Press, Cambridge, 1984.

Miyake, R., et al. "Micro mixer with fast diffusion." Micro Electro Mechanical Systems, Mems 93, An Investigation of Micro Structures, Sensors, Actuators, Machines & Systems IEEE IEEE, 1993:248-253.

Jovanović, J., et al. Liquid-Liquid Flow in a Capillary Microreactor: Hydrodynamic Flow Patterns and Extraction Performance. Industrial & Engineering Chemistry Research, 51(2), 1015-1026.

Kashid M N., et al. Hydrodynamics of liquid-liquid slug flow capillary microreactor: Flow regimes, slug size and pressure drop[J]. Chemical Engineering Journal, 2007, 131( 1-3): 1-13.

Zhao, Y., et al. Liquid-liquid two-phase mass transfer in the T-junction microchannels. AlChE Journal, 2007, 53(12), 3042-3053.

Wu, K.-J., et al. Hydrodynamic Study of Single- and Two-Phase Flow in an Advanced-Flow Reactor. Industrial & Engineering Chemistry Research, 2015, 54(30), 7554-7564.

Stroock, A D,et al. Chaotic Mixer for Microchannels.[J]. Science, 2002.,295 ,647-651.

* cited by examiner

MULTI-LAYERED MICRO-CHANNEL MIXER AND METHOD FOR MIXING FLUIDS

CROSS-REFERENCE TO RELATED APPLICATIONS

This application claims the benefit of priority from Chinese Patent Application No. 202010975520.X, filed on Sep. 16, 2020. The content of the aforementioned application, including any intervening amendments thereto, is incorporated herein by reference in its entirety.

TECHNICAL FIELD

The present application relates to a type of chemical engineering equipment, and more specifically to a multi-layered micro-channel mixer and a method for fast and highly-efficient mixing of two miscible fluids (i.e. homogeneous phase), and immiscible liquid-liquid or gas-liquid two-phase fluids.

BACKGROUND

A micro-channel mixer is a micro-mixer equipment having a fluid channel with a hydraulic diameter ranging from tens of microns to several millimeters (W. Enrfeld, V. Hessel, H. Lowe, *Microreactors: New Technology for Modern Chemistry*, Wiley VCH, Weinheim, Germany, 2000; *Chemical Micro Process Engineering*, V. Hessel, H. Lowe, Wiley VCH, Weinheim, Germany, 2004). The micro-channel mixer is usually used as key equipment for mixing of reactants in the micro-reaction flow chemistry system and its performance directly affects the conversion rate, selectivity, yield, process energy consumption and product quality, etc. Since the Reynolds number of the fluid flow in the micro-channel is small, it generally falls into laminar flow regime. Hence, the mixing of reactants in the micro-channel is mainly realized by molecular diffusion. According to the diffusion theory, the diffusion time is directly proportional to the square of the diffusion distance (Cussler E. L., *Diffusion Mass Transfer in Fluid Systems*, Cambridge University Press, New York, 1984, 52-53), so the mixing in the liquid medium is generally very slow. For instance, it takes 1 second for a molecule to diffuse 1 μm, and approximately 1000 s for a molecule to diffuse 1 mm (Miyake et al., Micromixer with Fast Diffusion, *Proceedings IEEE Micro Electro Mechanical Systems,* 1993, 7, 248-253). Therefore, it is of great significance to develop highly-efficient micro-channel mixers and methods for mixing fluids.

In order to intensify the mixing of fluids in the micro-scale space, several methods, such as modifying the geometrical configuration of the channel and introducing an external field (or external force), have been usually adopted to increase the contact area between fluids, shorten the diffusion distance and generate flow disturbances, secondary eddies and chaotic convection to improve the degree of mixing and mixing efficiency. Currently, there are two types of micro-channel mixers, i.e., active micro-channel mixers and passive micro-channel mixers. With regard to the active micro-channel mixer, the flow field of the fluid in the micro-channel is disturbed by using some kind of external force (such as micro agitation, pressure disturbance, acoustic disturbance, electricity, magnetism and heat) to increase the contact area between fluids and intensify molecular diffusion, allowing for improved mixing efficiency and degree of mixing. However, the drawbacks of the active micro-channel mixer are that they are difficult to manufacture, and to be integrated into a practical system, challenging to scale up and high cost, which greatly limits its industrial applications. By contrast, the passive micro-channel mixer does not require external power or external force, and can achieve a specific flow field by changing the geometric structure of the channel, which increases the effective contact area between fluids, shortens molecular diffusion distance and strengthens convection, chaotic convection and secondary eddies, allowing for improved mixing performance. The commonly used channel structure includes slotted channel, stratified flow, serpentine channel, and induced chaotic convection, etc. The passive mixer is simple in geometrical structure, easy to control and convenient to be integrated, and needs no external power or external force, which has attracted wide attention.

Among the passive micro-mixers, the commonly-used T-shaped and Y-shaped micro-mixers are simple in structure and easy to machine. However, they have very complicated flow patterns, and their mixing processes depend on a specific flow pattern which can only be generated under extremely limited range of operating conditions, thereby resulting in difficult process manipulation and poor practicability (Jovanovic et al., Liquid-Liquid Flow in a Capillary Microreactor: Hydrodynamic Flow Patterns and Extraction Performance, *Industrial & Engineering Chemistry Research,* 2012, 51, 1015-1026; Kashid et al., Hydrodynamics of Liquid-Liquid Slug Flow Capillary Microreactor: Flow Regimes, Slug Size and Pressure Drop, *Chemical Engineering Journal,* 2007, 131, 1-13; Zhao et al., Liquid-Liquid Two-phase Mass Transfer in the T-junction Microchannels, *AIChE Journal,* 2007, 53, 3042-3053). Chinese Patent No. 101873890B, U.S. Pat. No. 7,939,033 and WO Patent No. 2009/009129 all disclosed a heart-shaped micro-channel reactor, in which eddies and swirling flows can be generated at high flow rates to achieve relatively good mixing and high mass transfer coefficient. However, its pressure drop is excessively high, which leads to a high level of energy consumption. Moreover, when immiscible two phases (e.g., gas-liquid or liquid-liquid) are involved, the immiscible two phases are prone to separate from each other when operated at relatively low flow rates (Wu et al., Hydrodynamic Study of Single- and Two-Phase Flow in an Advanced Flow Reactor, *Industrial & Engineering Chemistry Research,* 2015, 54, 7554-7564). Stroock et al., (Chaotic Mixer for Microchannels, Science, 2002, 295, 647-651) proposed a staggered herringbone micro mixer, in which transverse flow and chaotic convection are generated due to the presence of the herringbone to enhance the mixing. However, this micro-mixer only ensure a better mixing under a large Reynolds number, and its additional disadvantages includes large pressure drop, high energy consumption, easy blockage, and difficult installation and cleaning.

Therefore, there is an urgent need for those skilled in the art to develop a micro-channel mixer with a wide range of operating conditions, desirable mixing effect, high mass transfer coefficient, small pressure drop and very low energy consumption.

SUMMARY

In view of the above defects in the prior art, the present disclosure provides a multi-layered micro-channel mixer with excellent mixing effect, high mass transfer coefficient, very small pressure drop and low energy consumption and a method for mixing fluids using the multi-layered micro-channel mixer. The mixing of two miscible fluids (i.e.

homogeneous phase) and immiscible liquid-liquid or gas-liquid two-phase fluids can be considerably enhanced because of its improved geometrical configuration.

Technical solutions of this application are specifically described as follows.

Provided is a multi-layered micro-channel mixer, comprising:

a base plate; and a cover plate;

wherein two inlet fluid reservoirs, two inlet channels, two groups of fluid distribution channel networks, two groups of process fluid channels, an impinging stream mixing chamber, a fluid mixing intensification channel and an outlet buffer reservoir are provided on the base plate; the cover plate is provided with three through-holes; two of the three through-holes are connected with the two inlet fluid reservoirs on the base plate, respectively, and employed as inlets of fluid materials to be mixed; another one of the three through-holes is connected with the outlet buffer reservoir on the base plate and is used as an outlet of mixed fluid material; one end of each of the two inlet fluid reservoirs is connected with an external feed tube via the corresponding through-hole in the cover plate, and the other end of each of the two inlet fluid reservoirs is connected with one of the two inlet channels; each of the two inlet channels is connected with one group of process fluid channels via one group of fluid distribution channel network;

each group of the fluid distribution channel network is composed of N stages of fluid distribution channels with different hydraulic diameters, wherein N is an integer ranging from 1-10; the first stage fluid distribution channels are directly connected with the two inlet channels, respectively; the $N^{th}$ stage fluid distribution channels diverge into $2^N$ branch channels that are connected with $2^N$ next stage (i.e., $(N+1)^{th}$ stage) fluid distribution channels, or $2^{(N+1)}$ branch channels that are connected with $2^{(N+1)}$ process fluid channels; each fluid distribution channel diverges into two branch channels; each branch channel of the fluid distribution channel is either connected with a next stage fluid distribution channel or two process fluid channels; each branch channel of the last stage fluid distribution channels further diverges into two branches that are connected with two process fluid channels, respectively; and one end of each of the process fluid channels is connected with one branch channel of the last stage fluid distribution channels, and the other end of each of the process fluid channels is the outlet end and fixed inside the impinging stream mixing chamber; the two groups of process fluid channels are connected with the two inlet channels, respectively, and are symmetrically arranged on both sides of the impinging stream mixing chamber; the end of each of the process fluid channels inside the impinging stream mixing chamber is tapered; the impinging stream mixing chamber is directly connected with the fluid mixing intensification channel; internals or baffles are installed in the impinging stream mixing chamber and fluid mixing intensification channel; the fluid mixing intensification channel is connected with the outlet buffer reservoir; and the outlet buffer reservoir is connected with an external discharge tube via the another one of the three through-holes.

In an embodiment, the angle α formed between the inlet channel and the corresponding first stage fluid distribution channel is 70°-130°.

The angle α directly affects the flow distribution of the fluid in the first stage fluid distribution channel, namely the distribution ratio of the flow entering the two branch channels of the first stage fluid distribution channel, which further influences the overall mixing effect and total pressure drop of the micro-channel mixer provided herein.

In an embodiment, the angle β formed between the branch channel and the corresponding next stage fluid distribution channel is 70°-130°.

The angle β directly affects the flow distribution of the fluid in the next stage fluid distribution channel, namely the distribution ratio of the flow entering the two branch channels of the next stage fluid distribution channel, which greatly affects the overall mixing effect and total pressure drop of the micro-channel mixer provided herein.

In an embodiment, the angle γ formed between two process fluid channels that are connected with the same branch channel is 95°-150°. The angle γ has a great effect on the final mixing effect and total pressure drop of the micro-channel mixer of the disclosure.

In an embodiment, each of the two inlet channels has a rectangular cross section. In an embodiment, each of the two inlet channels has a width of 50 μm-10 mm, a depth of 50 μm-10 mm and a length of 1-500 mm.

In an embodiment, the two inlet channels are symmetrically arranged on both sides of the impinging stream mixing chamber.

In an embodiment, each of the fluid distribution channels has a rectangular cross section; each of the first stage fluid distribution channels has a width of 0.1-30 mm, a depth of 0.1-15 mm and a length of 1-200 mm; the width, depth and length of the $N^{th}$ stage fluid distribution channel are 40%-90%, 40%-90% and 20%-80% of those of the $(N-1)^{th}$ stage fluid distribution channel respectively, where N is an integer greater than or equal to 2.

In an embodiment, the cross section of each of the process fluid channels is rectangular.

In an embodiment, the cross section of the impinging stream mixing chamber is rectangular.

In an embodiment, the cross section of the fluid mixing intensification channel is rectangular.

In an embodiment, each of the process fluid channels has a width of 50-1000 μm, a depth of 50-1000 μm and a length of 1-200 mm.

In an embodiment, the impinging stream mixing chamber has a width of 50 μm-10 mm, a depth of 50 μm-10 mm and a length of 1-500 mm.

In an embodiment, the fluid mixing intensification channel has a width of 50 μm-10 mm, a depth of 50 μm-10 mm and a length of 1-1000 mm.

In an embodiment, the baffles are installed in interval arrangement at both side walls of the impinging stream mixing chamber, and the angle θ formed between the baffle and the corresponding side wall is 20° to 160°.

The angle θ has a relatively great effect on the overall mixing process of the fluids in the micro-channel mixer provided herein.

In an embodiment, when the angle θ is smaller than 90°, the baffles are forward-inclined; when the angle θ is greater than 90°, the baffles are backward-inclined and when the angle θ is 90°, the baffles are vertical.

In an embodiment, the internals or baffles in the impinging stream mixing chamber are fixed away from the central axes of the process fluid channels, and are not in the same horizontal planes with the central axes of the process fluid channels. In an embodiment, the distance between the central axis of the process fluid channel and its neighboring baffle or internal is 50-800 μm.

In an embodiment, the height of the baffles or the internals in the impinging stream mixing chamber is equal to the depth of the impinging stream mixing chamber.

In an embodiment, the width of the baffles in the impinging stream mixing chamber is 0.1-0.9 times that of the impinging stream mixing chamber.

In an embodiment, the length of the baffles in the impinging stream mixing chamber is 0.1-2.0 times the width of the impinging stream mixing chamber.

In an embodiment, the width of the internals in the impinging stream mixing chamber is 0.1-0.9 times that of the impinging stream mixing chamber.

In an embodiment, the length of the internals in the impinging stream mixing chamber is 0.1-2.0 times the width of the impinging stream mixing chamber.

In an embodiment, the distance between two adjacent baffles or internals is 50 mm in the impinging stream mixing chamber.

For compact arrangement, the distance between the two adjacent baffles or internals is set at 50 μm-500 μm; and for loose arrangement, the distance between the two adjacent baffles or f internals is set at 500 mm. The compact arrangement of the baffles or internals is more conducive to the improvement of the degree of mixing and the mass transfer coefficient.

In an embodiment, the baffles are installed in interval arrangement at both side walls of the fluid mixing intensification channel, and the angle φ formed between the baffle and the corresponding side wall of the mixing channel is 20°-160°.

The angle φ has a relatively great effect on the overall mixing process of the fluids in the micro-channel mixer provided herein.

In an embodiment, when the angle φ is smaller than 90°, the baffles are forward-inclined baffles; when the angle φ is greater than 90°, the baffles are backward-inclined baffles; and when the angle φ is 90°, the baffles are vertical baffles.

In an embodiment, the height of the baffles or the internals in the fluid mixing intensification channel is equal to the depth of the fluid mixing intensification channel.

In an embodiment, the width of the baffles is 0.1-0.9 times that of the mixing channel.

In an embodiment, the length of the baffles is 0.1-2.0 times the width of the mixing channel.

In an embodiment, the width of the internals is 0.1-0.9 times that of the mixing channel.

In an embodiment, the length of the internals is 0.1-2.0 times the width of the fluid mixing intensification channel.

In an embodiment, the distance between two adjacent baffles or internals in the fluid mixing intensification channel is 50 μm-5 mm.

For compact arrangement, the distance between two adjacent baffles or internals is set at 50-500 μm; and for loose arrangement, the distance between two adjacent baffles or internals is set at 500 μm-5 mm. The compact arrangement of the baffles or the internals is more conducive to the improvement of the degree of mixing and the mass transfer coefficient.

In an embodiment, the outlet of each of the process fluid channels inside the impinging stream mixing chamber is tapered, which has a width of 1-500 μm.

In an embodiment, the process fluid channels are symmetrically arranged with respect to the impinging stream mixing chamber.

In an embodiment, all the process fluid channels arranged on the same side of the impinging stream mixing chamber constitute one group of process fluid channels.

In an embodiment, the distance between the two tapered outlets of two process fluid channels symmetrically arranged with respect to the impinging stream mixing chamber is 10-500 μm.

In an embodiment, the fluid distribution channels arranged on the same side of the impinging stream mixing chamber constitute one group of the fluid distribution channel network.

In an embodiment, the internals in the impinging stream mixing chamber or the fluid mixing intensification channel are independently asterisk-shaped, X-shaped and Y-shaped.

The two inlet fluid reservoirs, two inlet channels, two groups of the fluid distribution channel networks, two groups of the process fluid channels, the impinging stream mixing chamber, the fluid mixing intensification channel and the outlet buffer reservoir are set on the same base plate, and the two inlet channels, the two groups of the fluid distribution channel networks and the two groups of the process fluid channels are symmetrically arranged on both sides of the impinging stream mixing chamber, which not only makes full use of the kinetic energy of the impinging fluid streams to achieve fast and highly-efficient mixing of fluid materials, but also reduces the pressure drop and hence energy consumption.

This application also provides a method for mixing of fluids using the above disclosed multi-layered micro-channel mixer, comprising:

- simultaneously pumping two fluids into the two inlet fluid reservoirs, respectively;
- allowing the two fluids to flow into the two groups of the process fluid channels sequentially through the two inlet channels and the two groups of the fluid distribution channel networks, respectively;
- allowing the two fluids to flow into the impinging stream mixing chamber from the two groups of the process fluid channels, respectively;
- subjecting the two fluids to oppositely impinge upon each other to mix the two fluids;
- subjecting the mixed fluid to vortex or secondary flow generated by the baffles or internals to improve the degree of mixing;
- allowing the mixed fluid mixture to flow into the fluid mixing intensification channel;
- subjecting the mixed fluid mixture to vortex or secondary flow generated by the baffles or internals to further intensify the flow disturbance of the mixed fluid mixture and enhance the degree of mixing; and
- discharging the mixed fluid material through the outlet buffer reservoir.

Compared with the prior art, the present disclosure has the following advantages.

(1) After entering the inlet channel, the fluid is distributed into multiple branching streams via the multi-stage fluid distribution channel networks, and then the multiple branching streams flow into the process fluid channels. Since the process fluid channels have very small hydraulic diameter, which greatly increases the flow velocity.

In addition, the process fluid channels have tapered outlets in the impinging stream mixing chamber, which can further increase the velocity of the fluid ejected from the outlets of the process fluid channels. After ejected from the symmetrical process fluid channels, the two streams of fluids impinge oppositely upon each other at a high speed, enabling rapid and highly-efficient mixing of fluids.

(2) The internals or baffles inside the impinging stream mixing chamber can induce vortex or secondary flow to intensify the flow disturbance, thus improving the degree of mixing.

(3) The internals or baffles inside the fluid mixing intensification channel can induce vortex or secondary flow to intensify the flow disturbance, further intensifying mixing and improving the degree of mixing of fluid materials.

(4) The channel structure provided herein can achieve rapid and highly-efficient mixing of fluids at both low and high flow rates.

(5) The design of multi-stage fluid distribution channel network distributes the fluid entering from the inlet channel from stage to stage, which can effectively reduce the total pressure drop.

Therefore, the multi-layered micro-channel mixer provided herein has the advantage of a wide range of operating conditions, low cost, excellent mixing effect, high mass transfer coefficient, very small pressure drop and low energy consumption, and has good industrial application prospects.

The multi-layered micro-channel mixer of the disclosure is suitable for the mixing of various fluid materials, such as the mixing of homogeneous fluid materials, the gas-liquid mixing and the immiscible liquid-liquid mixing, which not only has excellent mixing effect, high mass transfer coefficient, very small pressure drop and low energy consumption, but also has a low inventory of liquid materials and thus an inherently safer process. Specifically, the mixer can be applied to hazardous or dangerous chemical processes in the fine chemistry and the pharmaceutical industry, such as chlorination, nitration, fluorination, hydrogenation, diazotization, oxidation, peroxidation, sulfonation and alkylation.

The disclosure will be further illustrated below with reference to the accompanying drawings to make the concept, features and technical effects obvious.

DETAILED DESCRIPTION OF EMBODIMENTS

The invention will be further described in detail below with reference to the embodiments and accompanying drawings to make the technical solutions clear and understood. In addition, the mentioned embodiments are merely illustrative of the invention, and are not intended to limit the invention.

With respect to the N-stage fluid distribution channel network mentioned herein, N is a positive integer selected from 1-10. The upper stage of the $N^{th}$ stage fluid distribution channels is the $(N-1)^{th}$ stage fluid distribution channels where N is a positive integer greater than or equal to 2. Accordingly, the next stage of the $N^{th}$ stage fluid distribution channels is $(N+1)^{th}$ stage fluid distribution channels, where N is a positive integer greater than or equal to 1.

As used herein, the $2^N$ branch channels represent that the number of the branch channels is the $N^{th}$ power of 2, and the $2^N$ next stage fluid distribution channels (i.e., $(N+1)^{th}$ stage) indicate that the number of the next stage fluid distribution channels is the $N^{th}$ power of 2.

As used herein, the $2^{(N+1)}$ branches indicate that the number of the branches is the $(N+1)^{th}$ power of 2; and the $2^{(N+1)}$ process fluid channels indicate that the number of the process fluid channels is the $(N+1)^{th}$ power of 2.

Figure 1:
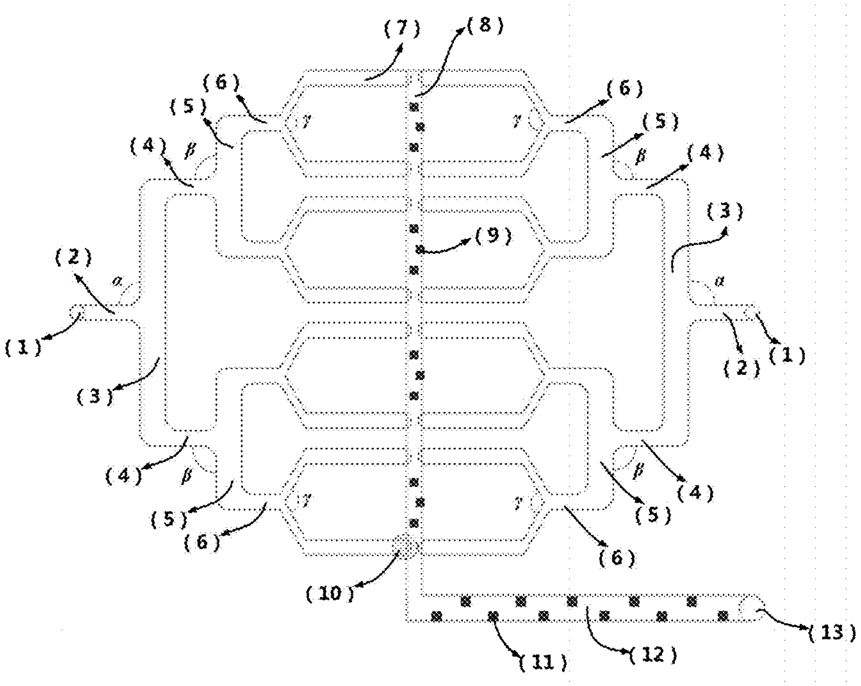
FIG. 1 schematically illustrates a multi-layered micro-channel mixer according to an embodiment of the disclosure.

As show in FIG. 1, a multi-layered micro-channel mixer with two-stage of fluid distribution channels is provided. It includes the inlet fluid reservoirs 1, the inlet channels 2, the first-stage fluid distribution channels 3, the branch channels of the first-stage fluid distribution channels 4, the second-stage fluid distribution channels 5, the branch channels of the second-stage fluid distribution channels 6, the process fluid channels 7, the impinging stream mixing chamber 8, the baffles in the impinging stream mixing chamber 9, the baffles in the fluid mixing intensification channel 11, the fluid mixing intensification channel 12 and the outlet buffer reservoir 13, where the process fluid channels 7 connect the second-stage fluid distribution channels 5 with the impinging stream mixing chamber 8 via the branch channels of the second-stage fluid distribution channels 6; and the baffles 9 and 11 are fixed inside the impinging stream mixing chamber 8 and the fluid mixing intensification channel 12, respectively.

Figure 2:
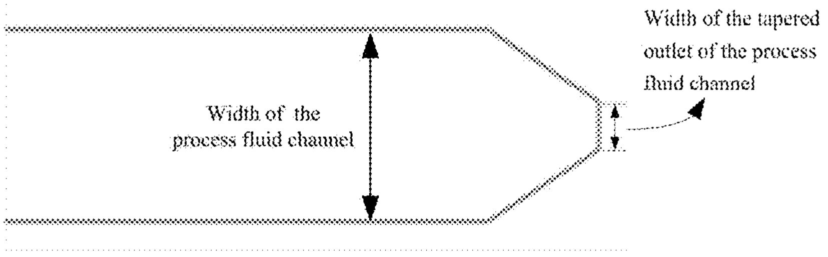
FIG. 2 is an enlarged view of the tapered outlet of a process fluid channel in the impinging stream mixing chamber in the multi-layered micro-channel mixer shown in FIG. 1.

One end of the inlet fluid reservoir 1 is connected with an external feed tube, and the other end is connected with the inlet channel 2. The inlet channel 2 is connected with the first-stage fluid distribution channel 3. The first-stage fluid distribution channel 3 has two branch channels 4, which are connected with two second stage fluid distribution channels 5, respectively. Each second stage fluid distribution channel 5 has two branch channels 6, which are connected with the impinging stream mixing chamber 8 via the process fluid channels 7. The baffles 9 are fixed in interval arrangement at both side walls of the impinging stream mixing chamber 8. The impinging stream mixing chamber 8 is directly connected with the fluid mixing intensification channel 12. The baffles 11 are fixed in interval arrangement at both side walls of the fluid mixing intensification channel 12. The fluid mixing intensification channel 12 is connected with the outlet buffer reservoir 13. The process fluid channels 7 are symmetrically arranged on both sides of the impinging stream mixing chamber 8. One end of the process fluid channel 7 is connected with the branch channel 6 of the second stage fluid distribution channel 5, and the other end has a tapered outlet 10 located inside the impinging stream mixing chamber 8, whose enlarged view is shown in FIG. 2.

During use, a first fluid and a second fluid are simultaneously pumped into the two inlet fluid reservoirs 1, respectively. The two fluids then flow into the first stage fluid distribution channels 3 via the inlet channels 2, respectively. Each fluid stream is branched into two streams via the first stage fluid distribution channel 3 and then is further branched into eight small streams via the second stage fluid distribution channel 5. The two fluid streams impinge oppositely upon each other to mix in the impinging stream mixing chamber 8 through the symmetrically arranged process fluid channels 7 to form a mixture, which then flows along the impinging stream mixing chamber 8. The existence of baffles 9 can induce the formation of vortex or secondary flow when the mixture flowing through the impinging stream mixing chamber 8, which can intensify the flow disturbance and enhance mixing. Then the fluid material flows into the fluid mixing intensification channel 12 in which the mixing is further enhanced due to the existence of baffles 11. The mixed fluid mixture is discharged out of the mixer via the outlet buffer chamber 13. During the aforementioned process, the velocities of the fluid streams ejected from the symmetrically arranged process fluid channels 7 are further accelerated by the tapered outlets 10 forming two opposing jets to impinge upon each other. As a result, mixing between the two fluids is effectively intensified. Furthermore, the internals or baffles 9 inside the impinging stream mixing chamber 8 can improve the mixing, while the internals or baffles 11 in the fluid mixing intensification channel 12 can further enhance the mixing, thereby realizing rapid and highly-efficient mixing of fluids.

Figure 3:
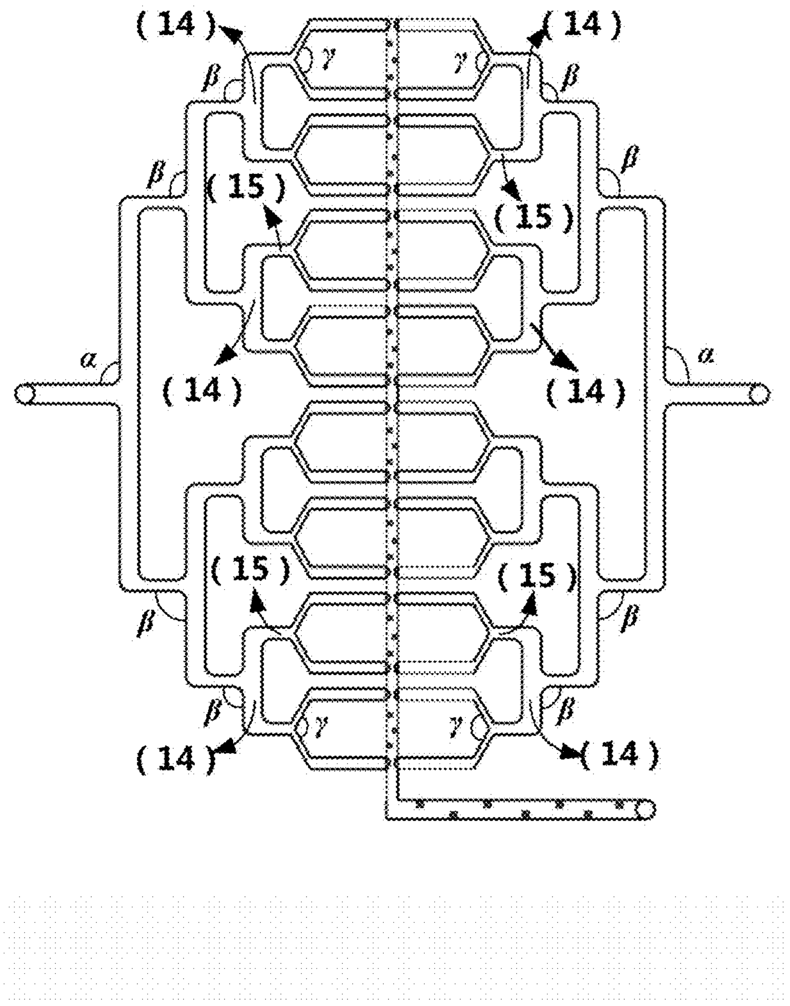
FIG. 3 schematically illustrates a multi-layered micro-channel mixer according to an embodiment of the disclosure.
Figure 4:
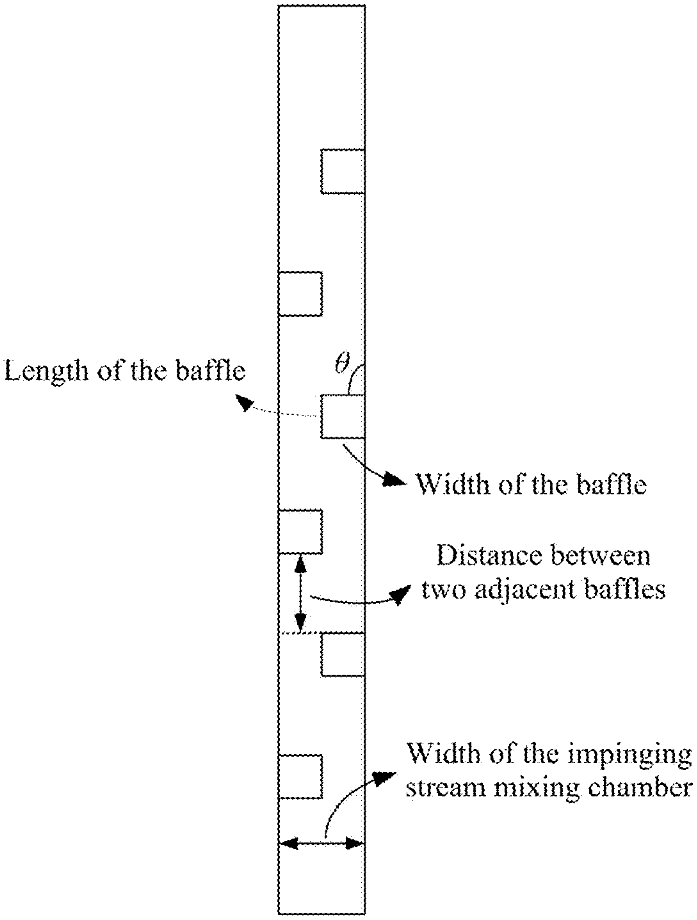
FIG. 4 is a partial view of the baffles fixed inside the impinging stream mixing chamber according to an embodiment of the disclosure.
Figure 5:
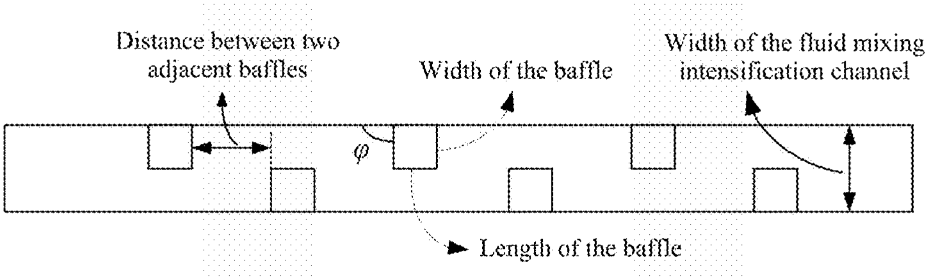
FIG. 5 shows the baffles inside the fluid mixing intensification channel according to an embodiment of the disclosure.
Figure 6:
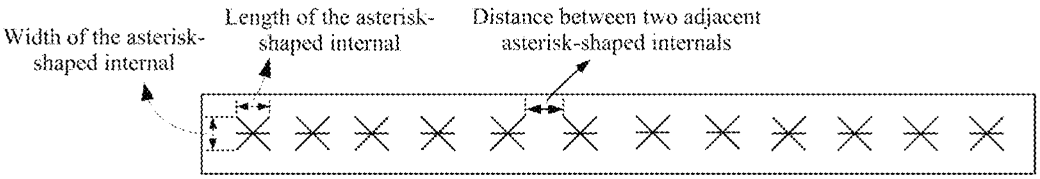
FIG. 6 schematically shows the arrangement of asterisk-shaped internals inside the fluid mixing intensification channel according to an embodiment of the disclosure.
Figure 7:
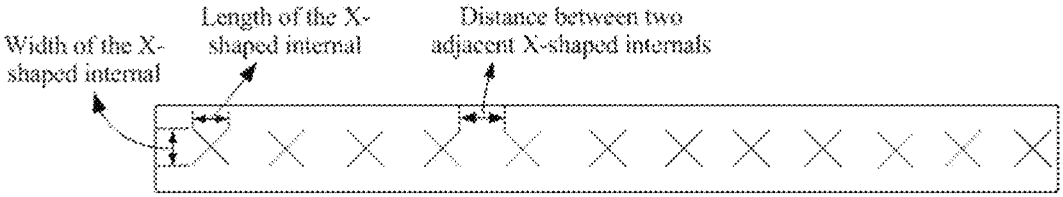
FIG. 7 schematically shows the arrangement of X-shaped internals inside the fluid mixing intensification channel according to an embodiment of the disclosure.
Figure 8:
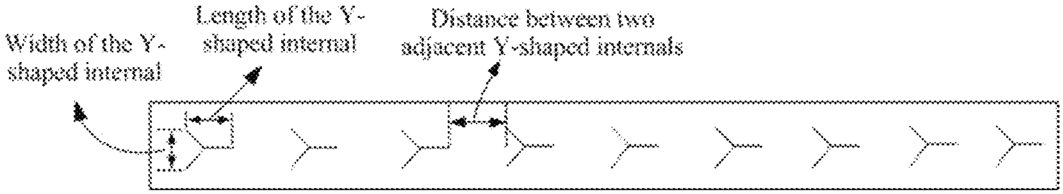
FIG. 8 schematically shows the arrangement of Y-shaped internals inside the fluid mixing intensification channel according to an embodiment of the disclosure.

As show in FIG. 3, a multi-layered micro-channel mixer with three-stage of fluid distribution channels is provided, in which the third stage fluid distribution channels 14 and their corresponding branch channels 15 are added compared to the mixer shown in FIG. 1.

FIGS. 4-8 schematically show the arrangement of the baffles inside the impinging stream mixing chamber 8, the arrangement of baffles inside the fluid mixing intensification channel 12 and the arrangement of asterisk-shaped internals, X-shaped internals and Y-shaped internals inside the fluid mixing intensification channel 12, respectively.

Embodiment 1

Provided herein is a micro-channel mixer including two-stage of fluid distribution channels (FIG. 1). The inlet channel has a width of 500 μm, a depth of 500 μm and a length of 30 mm. The first stage fluid distribution channels have a width of 800 μm, a depth of 500 μm and a length of 40 mm. The angle α between the inlet channel and the first stage fluid distribution channel is 90°. The second stage fluid distribution channels have a width of 500 μm, a depth of 300 μm and a length of 15 mm. The angle β between the branch channel of the first stage fluid distribution channel and the second stage fluid distribution channel is 90°. The process fluid channels all have a width of 250 μm, a depth of 250 μm and a length of 15 mm, and the tapered outlet has a width of 150 μm (FIG. 2). The angle γ formed between two adjacent process fluid channels that co-connected with the same branch channel of the second stage fluid distribution channel is 120°. The impinging stream mixing chamber has a width of 500 μm, a depth of 300 μm and a length of 60 mm. The baffles are installed in interval arrangement at both side walls of the impinging stream mixing chamber (FIG. 4), the angle θ between each baffle and the side-wall surface is 90°. The baffles all have a height of 300 μm, a width of 200 μm and a length of 250 and the distance between two adjacent baffles is 400 The distance between the tapered outlets of two process fluid channels symmetrically arranged on both sides of the impinging stream mixing chamber is 200 μm. The fluid mixing intensification channel has a width of 500 μm, a depth of 300 μm and a length of 100 mm. The baffles are installed in interval arrangement at both side walls of the fluid mixing intensification channel (FIG. 5), and the angle φ between each baffle and the side-wall surface is 90°. The baffles in the fluid mixing intensification channel have a height of 300 μm, a width of 200 μm and a length of 250 μm, and the distance between two adjacent baffles is 400 μm.

The micro-mixing effect of the micro-channel mixer provided herein is evaluated by Villermaux-Dushman protocol (iodide/iodate parallel competition reaction), and the involved reaction schemes are described as follows:

$$H_2BO_3^{-}+H^{+} \rightarrow H_3BO_3$$

$$5I^{-}+IO_3^{-}+6H^{+} \rightarrow 3I_2+3H_2O$$

$$I_2+I^{-} \rightarrow I_3^{-}$$

The segregation index $X_s$ is adopted to quantitatively characterize the micro-mixing effect of the micro-channel mixer, which is calculated by the following formulas:

$$X_s = \frac{Y}{Y_{ST}}$$

$$Y = \frac{2([I_2] + [I_3^-])}{[H^+]_0}$$

$$Y_{ST} = \frac{6[IO_3^-]_0}{6[IO_3^-]_0 + [H_2BO_3^-]_0}$$

where $[I_2]$ represents the concentration of $I_2$ in the mixed fluid flowing out of the outlet of the mixer; $[I_3^-]$ represents the concentration of $I_3^-$ in the mixed fluid flowing out of the outlet of the mixer; $[IO_3^-]_0$ represents the initial concentration of $IO_3^-$; $[H_2BO_3^-]_0$ represents the initial concentration of $H_2BO_3^-$; $X_s$=0, indicating an ideal micro-mixing state; $X_s$=1, indicating a completely segregated state; and a smaller $X_s$ indicates a better micro-mixing effect.

In the above Villermaux-Dushman reaction system, the first fluid contains $1.16\times10^{-3}$ mol/L of KI, $2.23\times10^{-3}$ mol/L of $KIO_3$ and $1.818\times10^{-2}$ mol/L of $H_3BO_3$; and the second fluid contains $9.09\times10^{-2}$ mol/L of NaOH. The first fluid and the second fluid are simultaneously fed to the micro-channel mixer provided herein at a flow rate of 0.5 mL/min. The segregation index is calculated to be 0.0025 by determining the value of $[I_3^-]$ in the mixed fluid at the outlet of the micro-channel mixer. Under the same conditions, the segregation index of T-type mixer, Y-type mixer, static mixer, coaxial flow micro-mixer and flow-focusing micro-mixer are 0.023, 0.019, 0.016, 0.017 and 0.018, respectively. Moreover, the total pressure drop between the inlet and outlet of the micro-mixer provided in this embodiment is 105 Pa, while under the same conditions, the total pressure drops of T-type mixer, Y-type mixer, static mixer, coaxial flow micro-mixer and flow-focusing micro-mixer are 418 Pa, 402 Pa, 560 Pa, 378 Pa and 435 Pa, respectively. These results indicate that the mixing effect of the micro-channel mixer provided herein is much better than those of the T-type mixer, Y-type mixer, static mixer, coaxial flow micro-mixer and flow-focusing micro-mixer.

Embodiment 2

Provided herein is a micro-channel mixer including three stages of fluid distribution channels (FIG. 3), where the third stage fluid distribution channels have a width of 300 μm, a depth of 210 μm and a length of 7 mm. The angle β between the branch channel of the second stage fluid distribution channel and the third stage fluid distribution channel is 90°. All other structural parameters of the micro-channel mixer and the micro-mixing evaluation methods are the same as those in Embodiment 1. In this embodiment, the segregation index is determined to be 0.0021, and the total pressure drop between the inlet and outlet of the micro-mixer is 117 Pa.

Embodiment 3

Provided herein is a micro-channel mixer including four stages of fluid distribution channels, where the fourth stage fluid distribution channels have a width of 200 μm, a depth of 150 μm and a length of 4 mm. The angle β between the branch channel of the third stage fluid distribution channel and the fourth stage fluid distribution channel is 90°. All other structural parameters of the micro-channel mixer and the micro-mixing evaluation methods are the same as those in Embodiment 2. In this embodiment, the segregation index is determined to be 0.0018, and the total pressure drop between the inlet and outlet of the micro-mixer is 125 Pa.

The comparison of Embodiments 1, 2 and 3 demonstrates that an increase in the number of stages of the fluid distribution channels leads to an enhanced mixing.

Embodiment 4

The micro-channel mixer and the micro-mixing evaluation methods used herein are the same as those in Embodiment 1, except that the outlet of the process fluid channels of the micro-channel mixer provided herein is not tapered in the impinging stream mixing chamber, and the width of the outlet is the same as that of the process fluid channel. In this case, the segregation index is determined to be 0.0062, and the total pressure drop between the inlet and outlet is 103 Pa.

Embodiment 5

The micro-channel mixer and the micro-mixing evaluation methods used herein are the same as those in Embodiment 1, except that the impinging stream mixing chamber has a width of 800 μm, a depth of 300 μm and a length of 60 mm. In this case, the segregation index is determined to be 0.0041, and the total pressure drop between the inlet and outlet is 101 Pa.

Embodiment 6

The micro-channel mixer and the micro-mixing evaluation methods herein are the same as those in Embodiment 1, and the only difference is that the impinging stream mixing chamber used in this embodiment has a width of 800 μm, a depth of 300 μm and a length of 100 mm. In this case, the segregation index is determined to be 0.0052, and the total pressure drop between the inlet and outlet is 101 Pa.

Embodiments 7-9

The micro-channel mixer and the characterization methods provided in Embodiment 1 are employed herein, and in Embodiments 7-9, the angle α between the inlet channel and the first stage fluid distribution channel is varied to assess its effect on the mixing effect of the micro-channel mixer. The values of a, and the corresponding segregation indexes and total pressure drops in these embodiments are listed in Table 1 (referring to Embodiment 1 for all the other parameters).

TABLE 1

Effect of α on the segregation index and the total pressure drop

| | Angle α between the inlet channel and the first stage fluid distribution channel | Segregation index | Total pressure drop |
|---|---|---|---|
| Embodiment 7 | 70° | 0.0029 | 103 Pa |
| Embodiment 8 | 100° | 0.0023 | 107 Pa |
| Embodiment 9 | 130° | 0.0020 | 109 Pa |

It can be concluded from the comparison between Embodiment 1 and Embodiments 7-9 that a larger value of a leads to a smaller segregation index and thus a better micro-mixing.

Embodiments 10-12

The micro-channel mixer and the characterization methods provided in Embodiment 1 are employed herein, and in Embodiments 10-12, the angle β between the branch channel of the first stage fluid distribution channel and the second stage fluid distribution channel is varied to assess its effect on the mixing. The values of β, and the corresponding segregation indexes and total pressure drops in these embodiments are listed in Table 2 (referring to Embodiment 1 for all the other parameters).

TABLE 2

Effect of β on the segregation index and the total pressure drop

| | Angle β between the branch channel of the first stage fluid distribution channel and the second stage fluid distribution channel | Segregation index | Total pressure drop |
|---|---|---|---|
| Embodiment 10 | 70° | 0.0027 | 103 Pa |
| Embodiment 11 | 100° | 0.0024 | 107 Pa |
| Embodiment 12 | 130° | 0.0022 | 109 Pa |

It can be concluded from the comparison between Embodiment 1 and Embodiments 10-12 that a larger value of β leads to a smaller segregation index and thus a better micro-mixing.

Embodiments 13-15

The micro-channel mixer and the characterization methods provided in Embodiment 1 are employed herein, and in Embodiments 13-15, the angle γ formed between two process fluid channels co-connected with the same branch channel of the second stage fluid distribution channel is varied to assess its effect on the mixing. The values of γ, and the corresponding segregation indexes and total pressure drops in these embodiments are listed in Table 3 (referring to Embodiment 1 for all the other parameters).

TABLE 3

Effect of γ on the segregation index and the total pressure drop

| | Angle γ formed between two second fluid channels co-connected with the same branch channel of the second stage fluid distribution channel | Segregation index | Total pressure drop |
|---|---|---|---|
| Embodiment 13 | 100° | 0.0023 | 102 Pa |
| Embodiment 14 | 130° | 0.0029 | 108 Pa |
| Embodiment 15 | 150° | 0.0036 | 109 Pa |

It can be concluded from the comparison between Embodiment 1 and Embodiments 13-15 that a smaller value of γ leads to a smaller segregation index and thus a better micro-mixing.

Embodiments 16-19

The micro-channel mixer and the characterization methods are used herein the same as those in Embodiment 1, and in Embodiments 16-19, the distance between two adjacent baffles in the impinging stream mixing chamber and the fluid mixing intensification channel is varied to assess its effect on the mixing. The specific parameters, and the corresponding segregation indexes and total pressure drops in these embodiments are listed in Table 4 (referring to Embodiment 1 for all the other parameters).

TABLE 4

Effect of the distance between two adjacent baffles on the segregation index and the total pressure drop

| | Distance between two adjacent baffles in the impinging stream mixing chamber | Distance between two adjacent baffles in the fluid mixing intensification channel | Segregation index | Total pressure drop |
|---|---|---|---|---|
| Embodiment 16 | 150 μm | 400 μm | 0.0017 | 110 Pa |
| Embodiment 17 | 650 μm | 400 μm | 0.0034 | 99 Pa |
| Embodiment 18 | 400 μm | 150 μm | 0.0019 | 111 Pa |
| Embodiment 19 | 400 μm | 650 μm | 0.0037 | 100 Pa |

It can be concluded from the comparison between Embodiment 1 and Embodiments 16-19 that a smaller distance between two adjacent baffles either in the impinging stream mixing chamber or the fluid mixing intensification channel results in a better micro-mixing.

Embodiments 20-23

The micro-channel mixer and the characterization methods provided in Embodiment 1 are employed herein, and in the Embodiments 20-23, the angle θ between the baffle and the side-wall surface is varied to assess its effect on the mixing. The values of θ, and the corresponding segregation indexes and total pressure drops in these embodiments are listed in Table 5 (referring to Embodiment 1 for all the other parameters).

TABLE 5

Effect of θ on the segregation index and the total pressure drop

| | Mixing chamber | Mixing channel | Segregation index | Total pressure drop |
|---|---|---|---|---|
| Embodiment 20 | θ = 30° | φ = 90° | 0.0038 | 93 Pa |
| Embodiment 21 | θ = 60° | φ = 90° | 0.0033 | 96 Pa |
| Embodiment 22 | θ = 120° | φ = 90° | 0.0037 | 95 Pa |
| Embodiment 23 | θ = 150° | φ = 90° | 0.0039 | 91 Pa |

It can be concluded from the comparison between Embodiment 1 and Embodiments 20-23 that the angle θ close to 90° leads to a better micro-mixing.

Embodiments 24-27

The micro-channel mixer and the characterization methods provided in Embodiment 1 are employed herein, and in Embodiments 24-27, the angle φ between the baffle and the side-wall of the fluid mixing intensification channel is varied to assess its effect on the mixing. The values of φ, and the corresponding segregation indexes and total pressure drops in these embodiments are listed in Table 6 (referring to Embodiment 1 for all the other parameters).

TABLE 6

Effect of φ on the segregation index and the total pressure drop

| | Mixing chamber | Mixing channel | Segregation index | Total pressure drop |
|---|---|---|---|---|
| Embodiment 24 | θ = 90° | φ = 30° | 0.0036 | 96 Pa |
| Embodiment 25 | θ = 90° | φ = 60° | 0.0029 | 97.5 Pa |
| Embodiment 26 | θ = 90° | φ = 120° | 0.0035 | 94 Pa |
| Embodiment 27 | θ = 90° | φ = 150° | 0.0037 | 92 Pa |

It can be concluded from the comparison between Embodiment 1 and Embodiments 24-27 that the angle φ close to 90° leads to a better micro-mixing.

Embodiments 28-38

The micro-channel mixer and the characterization methods used herein are the same as those in Embodiment 1, and in the Embodiments 28-38, the effects of the presence of baffles in the impinging stream mixing chamber and the fluid mixing intensification channel and the width of the baffles on the mixing are investigated. The specific parameters, and the corresponding segregation indexes and total pressure drops in these embodiments are listed in Table 7 (referring to Embodiment 1 for all the other parameters).

TABLE 7

Effect of the width of the baffles on the segregation index and the total pressure drop

| | Impinging stream mixing chamber | fluid mixing intensification channel | Segregation index | Total pressure drop |
|---|---|---|---|---|
| Embodiment 28 | No baffles | No baffles | 0.006 | 95 Pa |
| Embodiment 29 | baffles with a width of 100 μm | No baffles | 0.0052 | 97 Pa |
| Embodiment 30 | baffles with a width of 300 μm | No baffles | 0.0047 | 99 Pa |

TABLE 7-continued

Effect of the width of the baffles on the segregation index and the total pressure drop

| | Impinging stream mixing chamber | fluid mixing intensification channel | Segregation index | Total pressure drop |
|---|---|---|---|---|
| Embodiment 31 | baffles with a width of 370 μm | No baffles | 0.0041 | 103 Pa |
| Embodiment 32 | No baffles | Baffles with a width of 100 μm | 0.0057 | 97 Pa |
| Embodiment 33 | No baffles | Baffles with a width of 300 μm | 0.0051 | 99 Pa |
| Embodiment 34 | No baffles | Baffles with a width of 370 μm | 0.0048 | 103 Pa |
| Embodiment 35 | Baffles with a width of 100 μm | Baffles with a width of 100 μm | 0.0027 | 107 Pa |
| Embodiment 36 | Baffles with a width of 300 μm | Baffles with a width of 300 μm | 0.0021 | 109 Pa |
| Embodiment 37 | Baffles with a width of 370 μm | Baffles with a width of 370 μm | 0.0020 | 112 Pa |

TABLE 7-continued

Effect of the width of the baffles on the segregation index and the total pressure drop

| | Impinging stream mixing chamber | fluid mixing intensification channel | Segregation index | Total pressure drop |
|---|---|---|---|---|
| Embodiment 38 | Baffles with a width of 400 μm | Baffles with a width of 400 μm | 0.0019 | 117 Pa |

It can be concluded from the comparison between Embodiments 28-38 that the presence of baffles in the impinging stream mixing chamber or/and the fluid mixing intensification channel contributes to improving the micro-mixing, and baffles with a larger width result in a better micro-mixing.

Embodiments 39-49

The micro-channel mixer and the characterization methods used herein are the same as those in Embodiment 1, and in Embodiments 39-49, the effects of the presence of internals in the impinging stream mixing chamber or/and the fluid mixing intensification channel and their shape (FIGS. 6-8) and width on the mixing are investigated. The height of the internals is equal to the depth of the impinging stream mixing chamber or the fluid mixing intensification channel where they are installed; the length of the internals is 250 μm; and the distance between two adjacent internals is 500 μm. The specific parameters, and the corresponding segregation indexes and total pressure drops in these embodiments are listed in Table 8 (referring to Embodiment 1 for all the other parameters).

TABLE 8

Effect of the internals on the segregation index and the total pressure drop

| | Parameters of internals in the impinging stream mixing chamber | Parameters of internals in the fluid mixing intensification channel | Segregation index | Total pressure drop |
|---|---|---|---|---|
| Embodiment 39 | No baffles and internals | No baffles and internals | 0.006 | 95 Pa |
| Embodiment 40 | Asterisk-shaped internals with a width of 200 μm | No baffles and internals | 0.0046 | 98 Pa |
| Embodiment 41 | Asterisk-shaped internals with a width of 370 μm | No baffles and internals | 0.0040 | 101 Pa |
| Embodiment 42 | X-shaped internals with a width of 200 μm | No baffles and internals | 0.0048 | 98 Pa |
| Embodiment 43 | Y-shaped internals with a width of 200 μm | No baffles and internals | 0.0049 | 101 Pa |
| Embodiment 44 | No baffles and internals | Asterisk-shaped internals with a width of 200 μm | 0.0047 | 98 Pa |
| Embodiment 45 | No baffles and internals | Asterisk-shaped internals with a width of 370 μm | 0.0041 | 101 Pa |
| Embodiment 46 | No baffles and internals | X-shaped internals with a width of 200 μm | 0.0048 | 98 Pa |
| Embodiment 47 | No baffles and internals | Y-shaped internals with a width of 200 μm | 0.0050 | 101 Pa |
| Embodiment 48 | Asterisk-shaped internals with a width of 200 μm | Asterisk-shaped internals with a width of 200 μm | 0.0026 | 111 Pa |
| Embodiment 49 | Asterisk-shaped internals with a width of 370 μm | Asterisk-shaped internals with a width of 370 μm | 0.0021 | 114 Pa |

It can be concluded from the comparison of Embodiments 39-49 that the existence of internals in the impinging stream mixing chamber or the fluid mixing intensification channel is conducive to the enhancement of micro-mixing, and the simultaneous existence of internals in both the impinging stream mixing chamber and the fluid mixing intensification channel results in even better micro-mixing. Moreover, a wider internal leads to better micro-mixing.

Embodiment 50

The micro-channel mixer used herein is the same as that in Embodiment 1, and a water-succinic acid-1-butanol system is adopted to measure the liquid-liquid volumetric mass transfer coefficient of the micro-channel mixer, where the first fluid is deionized water saturated with 1-butanol, and is initially free of succinic acid; and the second fluid is 1-butanol saturated with water, and also contains 1 mol/L of succinic acid.

The first fluid and the second fluid are simultaneously fed to the micro-channel mixer at a flow rate of 0.6 mL/min. The aqueous phase discharged from the outlet of the micro-mixer is determined by HPLC for the succinic acid content, and the liquid-liquid volumetric mass transfer coefficient is calculated to be 15.1 $s^{-1}$. Under the same conditions, the liquid-liquid volumetric mass transfer coefficients of T-type mixer, Y-type mixer, static mixer, coaxial flow micro-mixer and flow-focusing micro-mixer are 7.2, 7.1, 8.6, 7.6 and 7.8 $s^{-1}$, respectively. The results indicate that the micro-channel mixer provided herein is superior to the T-type mixer, Y-type mixer, static mixer, coaxial flow micro-mixer and flow-focusing micro-mixer in terms of the liquid-liquid volumetric mass transfer.

Embodiment 51

Provided herein is a micro-channel mixer including three stages of fluid distribution channels (FIG. 3), where the third stage fluid distribution channels have a width of 300 μm, a depth of 210 μm and a length of 7 mm. The angle β between the branch channel of the second stage fluid distribution channel and the third stage fluid distribution channel is 90°. All other structural parameters of the micro-channel mixer and the micro-mixing evaluation methods are the same as those in Embodiment 50. In this embodiment, the liquid-liquid volumetric mass transfer coefficient is determined to be 15.5 $s^{-1}$.

Embodiment 52

Provided herein is a micro-channel mixer including four stages of fluid distribution channels, where the fourth stage fluid distribution channels have a width of 200 μm, a depth of 150 μm and a length of 4 mm. The angle β between the branch channel of the third stage fluid distribution channel and the fourth stage fluid distribution channel is 90°. All other structural parameters of the micro-channel mixer and the micro-mixing evaluation methods are the same as those in Embodiment 51. In this embodiment, the liquid-liquid volumetric mass transfer coefficient is determined to be 15.8 $s^{-1}$.

The comparison of Embodiments 50, 51 and 52 demonstrates that an increase in the number of stages of the fluid distribution channels leads to better liquid-liquid mass transfer process.

Embodiment 53

The micro-channel mixer and measurement methods used herein are the same as in Embodiment 50, and the only difference is that the outlet of the process fluid channels of the micro-channel mixer provided herein is not tapered in the impinging stream mixing chamber, and the width of the outlet is the same as that of the process fluid channel. In this case, the liquid-liquid mass volumetric transfer coefficient is determined to be 14.4 $s^{-1}$.

Embodiments 54-56

The micro-channel mixer and the characterization methods provided in Embodiment 50 are employed herein, and in Embodiments 54-56, the angle α between the inlet channel and the first stage fluid distribution channel is varied to assess its effect on the liquid-liquid mass transfer process. The values of α and the corresponding liquid-liquid volumetric mass transfer coefficients in these embodiments are listed in Table 9 (referring to Embodiment 50 for all other parameters).

TABLE 9

Effect of α on the liquid-liquid volumetric mass transfer coefficient

| | Angle α between the inlet channel and the first stage fluid distribution channel | Liquid-liquid volumetric mass transfer coefficient $s^{-1}$ |
|---|---|---|
| Embodiment 54 | 70° | 14.5 |
| Embodiment 55 | 100° | 15.6 |
| Embodiment 56 | 130° | 16.3 |

It can be concluded from the comparison between Embodiment 50 and Embodiments 54-56 that a larger value of angle α results in a larger liquid-liquid volumetric mass transfer coefficient and thus better two-phase mixing.

Embodiments 57-59

The micro-channel mixer and the characterization methods provided in Embodiment 50 are employed herein, and in Embodiments 57-59, the angle ft between the branch channel of the first stage fluid distribution channel and the second stage fluid distribution channel is varied to assess its effect on the liquid-liquid mass transfer process. The values of β and the corresponding liquid-liquid volumetric mass transfer coefficients in these embodiments are listed in Table 10 (referring to Embodiment 50 for all the other parameters).

TABLE 10

Effect of β on the liquid-liquid volumetric mass transfer coefficient

| | Angle β between the branch channel of the first stage fluid distribution channel and the second stage fluid distribution channel | Liquid-liquid volumetric mass transfer coefficient $s^{-1}$ |
|---|---|---|
| Embodiment 57 | 70° | 14.5 |
| Embodiment 58 | 100° | 15.4 |
| Embodiment 59 | 130° | 15.8 |

It can be concluded from the comparison between Embodiment 50 and Embodiments 57-59 that a larger value of angle β leads to a larger liquid-liquid volumetric mass transfer coefficient and thus better two-phase mixing.

Embodiments 60-62

The micro-channel mixer and the characterization methods provided in Embodiment 50 are employed herein, and in Embodiments 57-59, the angle γ formed between two adjacent process fluid channels co-connected with the same branch channel is varied to assess its effect on the liquid-liquid mass transfer process. The values of γ and the corresponding liquid-liquid volumetric mass transfer coefficients in these embodiments are listed in Table 11 (referring to Embodiment 50 for all the other parameters).

TABLE 11

Effect of γ on the liquid-liquid volumetric mass transfer coefficient

| | Angle γ formed between two adjacent process fluid channels co-connected with the same branch channel | Liquid-liquid volumetric mass transfer coefficient $s^{-1}$ |
|---|---|---|
| Embodiment 60 | 100° | 15.7 |
| Embodiment 61 | 130° | 14.6 |
| Embodiment 62 | 150° | 14.2 |

It can be concluded through the comparison between Embodiment 50 and Embodiments 60-62 that a smaller value of angle γ leads to a larger liquid-liquid volumetric mass transfer coefficient and thus better two-phase mixing.

Embodiments 63-73

The micro-channel mixer and the characterization methods used herein are the same as those in Embodiment 50, and in Embodiments 63-73, the effects of the presence of the baffles in the impinging stream mixing chamber and the fluid mixing intensification channel and the width of the baffles on the liquid-liquid mass transfer process are investigated. The specific parameters and the corresponding liquid-liquid volumetric mass transfer coefficients in these embodiments are listed in Table 12 (referring to Embodiment 50 for all the other parameters).

TABLE 12

Effect of the baffles on the liquid-liquid volumetric mass transfer coefficient

| | Impinging stream mixing chamber | Fluid mixing intensification channel | Liquid-liquid volumetric mass transfer coefficient ($s^{-1}$) |
|---|---|---|---|
| Embodiment 63 | No baffles | No baffles | 12.2 |
| Embodiment 64 | Baffles with a width of 100 μm | No baffles | 12.8 |
| Embodiment 65 | Baffles with a width of 300 μm | No baffles | 13.3 |
| Embodiment 66 | Baffles with a width of 370 μm | No baffles | 13.7 |
| Embodiment 67 | No baffles | Baffles with a width of 100 μm | 12.7 |
| Embodiment 68 | No baffles | Baffles with a width of 300 μm | 13.1 |
| Embodiment 69 | No baffles | Baffles with a width of 370 μm | 13.5 |
| Embodiment 70 | Baffles with a width of 100 μm | Baffles with a width of 100 μm | 14.5 |
| Embodiment 71 | Baffles with a width of 300 μm | Baffles with a width of 300 μm | 15.6 |
| Embodiment 72 | Baffles with a width of 370 μm | Baffles with a width of 370 μm | 15.9 |
| Embodiment 73 | Baffles with a width of 400 μm | Baffles with a width of 400 μm | 16.3 |

It can be concluded from the comparison of Embodiments 63-73 that the presence of baffles in the impinging stream mixing chamber or/and the fluid mixing intensification channel contributes to improve the liquid-liquid mass transfer process, and a baffle with a larger width leads to better liquid-liquid mass transfer.

Embodiments 74-84

The micro-channel mixer and the characterization method used herein are the same as those in Embodiment 50, and in the Embodiments 74-84, the effects of the presence of internals in the impinging stream mixing chamber and the fluid mixing intensification channel and their shape and width on the mixing are investigated. The height of the internals is equal to the depth of the impinging stream mixing chamber or fluid mixing intensification channel where they are installed; the length of the internals is 250 μm; and the distance between two adjacent internals is 500 μm. The specific parameters and the corresponding liquid-liquid volumetric mass transfer coefficients in these embodiments are listed in Table 13 (referring to Embodiment 50 for all the other parameters).

TABLE 13

Effect of the internals on the liquid-liquid volume mass transfer coefficient

| | Parameters of internals in the impinging stream mixing chamber | Parameters of internals in the fluid mixing intensification channel | Liquid-liquid volumetric mass transfer coefficient ($s^{-1}$) |
|---|---|---|---|
| Embodiment 74 | No baffles and internals | No baffles and internals | 12.2 |
| Embodiment 75 | Asterisk-shaped internals with a width of 200 μm | No baffles and internals | 13.1 |

TABLE 13-continued

| Effect of the internals on the liquid-liquid volume mass transfer coefficient | | | |
|---|---|---|---|
| | Parameters of internals in the impinging stream mixing chamber | Parameters of internals in the fluid mixing intensification channel | Liquid-liquid volumetric mass transfer coefficient ($s^{-1}$) |
| Embodiment 76 | Asterisk-shaped internals with a width of 370 μm | No baffles and internals | 13.6 |
| Embodiment 77 | X-shaped internals with a width of 200 μm | No baffles and internals | 13.0 |
| Embodiment 78 | Y-shaped internals with a width of 200 μm | No baffles and internals | 12.9 |
| Embodiment 79 | No baffles and internals | Asterisk-shaped internals with a width of 200 μm | 13.0 |
| Embodiment 80 | No baffles and internals | Asterisk-shaped internals with a width of 370 μm | 13.5 |
| Embodiment 81 | No baffles and internals | X-shaped internals with a width of 200 μm | 12.8 |
| Embodiment 82 | No baffles and internals | Y-shaped internals with a width of 200 μm | 12.7 |
| Embodiment 83 | Asterisk-shaped internals with a width of 200 μm | Asterisk-shaped internals with a width of 200 μm | 15.0 |
| Embodiment 84 | Asterisk-shaped internals with a width of 370 μm | Asterisk-shaped internals with a width of 370 μm | 15.3 |

It can be concluded from the comparison of Embodiments 74-84 that presence of internals in the impinging stream mixing chamber or the fluid mixing intensification channel is conducive to the enhancement of the liquid-liquid volume mass transfer process, and the simultaneous existence of internals in both the impinging stream mixing chamber and the fluid mixing intensification channel leads to even better liquid-liquid volumetric mass transfer process. Moreover, a wider internal results in better liquid-liquid mass transfer.

Embodiment 85

The micro-channel mixer used herein is the same as that in Embodiment 1, and a carbon dioxide-water system is adopted to measure the gas-liquid volumetric mass transfer coefficient of the micro-channel mixer. The carbon dioxide and the water are simultaneously fed to the micro-channel mixer at a flow rate of 0.6 mL/min. The aqueous phase discharged from the outlet of the micro-mixer is determined for the concentration of carbon dioxide, and the gas-liquid volumetric mass transfer coefficient is calculated to be 9.6 $s^{-1}$. Under the same conditions, the gas-liquid volumetric mass transfer coefficients of T-type mixer, Y-type mixer, static mixer, coaxial flow micro-mixer and flow-focusing micro-mixer are 5.8, 5.6, 7.1, 6.2 and 6.5 $s^{-1}$, respectively. The results indicate that the micro-channel mixer provided herein is superior to the T-type mixer, Y-type mixer, static mixer, coaxial flow micro-mixer and flow-focusing micro-mixer in terms of the gas-liquid mass transfer process.

Embodiment 86

Provided herein is a micro-channel mixer including three stages of fluid distribution channels, where the third stage fluid distribution channels have a width of 300 μm, a depth of 210 μm and a length of 7 mm. The angle β between the branch channel of the second stage fluid distribution channel and the third stage fluid distribution channel is 90°. All other structural parameters of the micro-channel mixer and the micro-mixing evaluation methods are the same as those in Embodiment 85. In this embodiment, the gas-liquid volumetric mass transfer coefficient is determined to be 9.9 $s^{-1}$.

Embodiment 87

Provided herein is a micro-channel mixer including four stages of fluid distribution channels, where the fourth fluid distribution channels have a width of 200 μm, a depth of 150 μm and a length of 4 mm. The angle β between the branch channel of the third stage fluid distribution channel and the fourth stage fluid distribution channel is 90°. All other structural parameters of the micro-channel mixer and the micro-mixing evaluation methods are the same as those in Embodiment 86. In this embodiment, the gas-liquid volumetric mass transfer coefficient is determined to be 10.6 $s^{-1}$.

The comparison of Embodiments 85, 86 and 87 demonstrates that an increase in the number of stages of the fluid distribution channels leads to enhanced gas-liquid mass transfer process.

Embodiment 88

The micro-channel mixer and measurement methods used herein are the same as in Embodiment 50, and only the difference is that the outlet of the process fluid channels of the micro-channel mixer provided herein is not tapered in the mixing chamber, and the width of the outlet is the same as that of the process fluid channel. In this case, the gas-liquid mass volumetric transfer coefficient is determined to be 8.7 $s^{-1}$.

Embodiments 89-99

The micro-channel mixer and the characterization methods used herein are the same as those in Embodiment 85, and in Embodiments 89-99, the effects of the presence of the baffles in the impinging stream mixing chamber and the fluid mixing intensification channel and the width of the baffles on the gas-liquid mass transfer process are investigated. The specific parameters and the corresponding gas-liquid volumetric mass transfer coefficients in these embodiments are listed in Table 14 (referring to Embodiment 85 for all the other parameters).

TABLE 14

Effect of the baffles on the gas-liquid volumetric mass transfer coefficient

| | Impinging stream mixing chamber | Fluid mixing intensification channel | Gas-liquid volumetric mass transfer coefficient ($s^{-1}$) |
|---|---|---|---|
| Embodiment 89 | No baffles | No baffles | 6.5 |
| Embodiment 90 | Baffles with a width of 100 μm | No baffles | 6.9 |
| Embodiment 91 | Baffles with a width of 300 μm | No baffles | 7.2 |
| Embodiment 92 | Baffles with a width of 370 μm | No baffles | 7.5 |
| Embodiment 93 | No baffles | Baffles with a width of 100 μm | 6.7 |
| Embodiment 94 | No baffles | Baffles with a width of 300 μm | 7.0 |
| Embodiment 95 | No baffles | Baffles with a width of 370 μm | 7.2 |
| Embodiment 96 | Baffles with a width of 100 μm | Baffles with a width of 100 μm | 9.2 |
| Embodiment 97 | Baffles with a width of 300 μm | Baffles with a width of 300 μm | 10.3 |
| Embodiment 98 | Baffles with a width of 370 μm | Baffles with a width of 370 μm | 10.8 |

TABLE 14-continued

Effect of the baffles on the gas-liquid volumetric mass transfer coefficient

| | Impinging stream mixing chamber | Fluid mixing intensification channel | Gas-liquid volumetric mass transfer coefficient ($s^{-1}$) |
|---|---|---|---|
| Embodiment 99 | Baffles with a width of 400 μm | Baffles with a width of 400 μm | 11.4 |

It can be concluded from the comparison of Embodiments 89-99 that the presence of baffles in the impinging stream mixing chamber or the fluid mixing intensification channel contributes to improving the gas-liquid mass transfer process and the simultaneous existence of baffles in both the impinging stream mixing chamber and the fluid mixing intensification channel leads to even better gas-liquid mass transfer process. Moreover, a wider baffle results in better gas-liquid mass transfer.

Embodiments 100-110

The micro-channel mixer and the characterization method used herein are the same as those in Embodiment 85, and in the Embodiments 100-110, the effects of the presence of internals in the impinging stream mixing chamber and the fluid mixing intensification channel and their shape and width on the gas-liquid mass transfer process are investigated. The height of the internals is equal to the depth of the impinging stream mixing chamber or the fluid mixing intensification channel where they are installed; the length of the internals is 250 μm; and the distance between two adjacent internals is 500 μm. The specific parameters and the corresponding gas-liquid volumetric mass transfer coefficients in these embodiments are listed in Table 15 (referring to Embodiment 85 for all the other parameters).

TABLE 15

Effect of the internals on the gas-liquid volume mass transfer coefficient

| | Parameters of internals in the impinging stream mixing chamber | Parameters of internals in the fluid mixing intensification channel | Gas-liquid volumetric mass transfer coefficient ($s^{-1}$) |
|---|---|---|---|
| Embodiment 100 | No baffles and internals | No baffles and internals | 6.5 |
| Embodiment 101 | Asterisk-shaped internals with a width of 200 μm | No baffles and internals | 7.1 |
| Embodiment 102 | Asterisk-shaped internals with a width of 370 μm | No baffles and internals | 7.5 |
| Embodiment 103 | X-shaped internals with a width of 200 μm | No baffles and internals | 7.0 |
| Embodiment 104 | Y-shaped internals with a width of 200 μm | No baffles and internals | 6.9 |
| Embodiment 105 | No deflection baffles and internals | Asterisk-shaped internals with a width of 200 μm | 7.0 |
| Embodiment 106 | No baffles and internals | Asterisk-shaped internals with a width of 370 μm | 7.4 |
| Embodiment 107 | No baffles and internals | X-shaped internals with a width of 200 μm | 6.9 |
| Embodiment 108 | No baffles and internals | Y-shaped internals with a width of 200 μm | 6.8 |
| Embodiment 109 | Asterisk-shaped internals with a width of 200 μm | Asterisk-shaped internals with a width of 200 μm | 9.5 |

TABLE 15-continued

Effect of the internals on the gas-liquid volume mass transfer coefficient

| | Parameters of internals in the impinging stream mixing chamber | Parameters of internals in the fluid mixing intensification channel | Gas-liquid volumetric mass transfer coefficient ($s^{-1}$) |
|---|---|---|---|
| Embodiment 110 | Asterisk-shaped internals with a width of 370 μm | Asterisk-shaped internals with a width of 370 μm | 9.9 |

It can be concluded from the comparison of Embodiments 100-110 that the presence of internals in the impinging stream mixing chamber or the fluid mixing intensification channel is conducive to the enhancement of the gas-liquid volumetric mass transfer coefficient, and the simultaneous existence of internals in both the impinging stream mixing chamber and the fluid mixing intensification channel leads to even better gas-liquid mass transfer process. Moreover, a wider internal results in better gas-liquid mass transfer.

Embodiment 111

The micro-channel mixer provided in Embodiment 1 is used to carry out the nitration of ethylbenzene. Specifically, the mixed acid of 98 wt. % sulfuric acid and 95 wt. % nitric acid (in a volume ratio of 4:3) and ethylbenzene are simultaneously pumped into the micro-channel mixer at the same flow rate of 0.1 mL/min. The temperature of the micro-channel mixer is set at 30° C. The residence time of the reaction mixture in the micro-channel mixer is 5 min. Sample is collected and analyzed from the effluent. The results exhibit that the conversion of the substrate ethylbenzene is 100%, and the yields of 4-ethylnitrobenzene and 2-ethylnitrobenzene are 51.9% and 45.2%, respectively.

The nitration of ethylbenzene by the same mixed acid is carried out at 30° C. in a batch-wise round-bottomed flask as well. The reaction is monitored by constant sampling and the corresponding offline analysis, and the results reveal that the conversion of ethylbenzene are about 50%, 77% and 97% after 3, 6 and 9 hours, respectively.

It can be seen that the micro-channel mixer provided herein can greatly shorten the reaction time of the nitration of the ethylbenzene with the mixed acid. In addition, the micro-channel mixer of the disclosure has a low inventory of liquid materials, which can improve the safety profile of the nitration process.

Described above are only preferred embodiments of the disclosure. It should be understood that various modifications and changes made by those of ordinary skill in the art based on the content of the disclosure without sparing any creative efforts should fall within the scope of the disclosure defined by the appended claims.

What is claimed is:

1. A multi-layered micro-channel mixer, comprising:

a base plate; and a cover plate;

wherein two inlet fluid reservoirs, two inlet channels, two groups of fluid distribution channel networks, two groups of process fluid channels, an impinging stream mixing chamber, a fluid mixing intensification channel and an outlet buffer reservoir are provided on the base plate; the cover plate is provided with three through-holes; two of the three through-holes are connected with the two inlet fluid reservoirs, respectively, and used as inlets of fluid materials to be mixed; the another one of the three through-holes is connected with the outlet buffer reservoir and used as an outlet of mixed fluid material; one end of each of the two inlet fluid reservoirs is connected with an external feed tube via a corresponding through-hole in the cover plate, and the other end of each of the two inlet fluid reservoirs is connected with one of the two inlet channels; each of the two inlet channels is connected with one group of process fluid channels via one group of fluid distribution channel network;

each of the two groups of fluid distribution channel networks is composed of N stages of fluid distribution channels with different hydraulic diameters, wherein N is an integer ranging from 1-10; the first stage fluid distribution channels are directly connected with the two inlet channels, respectively; the $N^{th}$ stage fluid distribution channels have $2^N$ branch channels that are connected with $2^N$ next stage fluid distribution channels, or have $2^{(N+1)}$ branch channels that are connected with $2^{(N+1)}$ process fluid channels; each fluid distribution channel has two branch channels; each branch channel is connected with either a next stage fluid distribution channel or two process fluid channels; each branch channel of the last stage fluid distribution channels has two branches which are connected with two process fluid channels, respectively;

one end of each of the process fluid distribution channels is connected with one branch channel of the last stage fluid distribution channels, and the other end of each of the process fluid channels is an outlet end and fixed inside the impinging stream mixing chamber; the two groups of process fluid channels are connected with the two inlet channels, respectively, and are symmetrically arranged on both sides of the impinging stream mixing chamber; the end of each of the process fluid channels inside the impinging stream mixing chamber is tapered; the impinging stream mixing chamber is directly connected with the fluid mixing intensification channel; internals or baffles are installed in the impinging stream mixing chamber; internals or baffles are installed in the fluid mixing intensification channel; the fluid mixing intensification channel is connected with the outlet buffer reservoir; and the outlet buffer reservoir is connected with an external discharge tube via the another one of the three through-holes;

an angle α formed between each of the inlet channels and the corresponding first stage fluid distribution channel is 70°-130°;

an angle β formed between each of the branch channels and the corresponding next stage fluid distribution channel is 70°-130°;

an angle γ formed between two adjacent process fluid channels that are connected with the same branch channel is 95°-150°;

each of the fluid distribution channels has a rectangular cross section; each of the first stage fluid distribution channels has a width of 0.1-30 mm, a depth of 0.1-15 mm and a length of 1-200 mm; the width, depth and length of the $N^{th}$ stage fluid distribution channel are 40%-90%, 40%-90% and 20%-80% of those of the $(N-1)^{th}$ stage fluid distribution channel, respectively, where N is an integer greater than or equal to 2;

the baffles are installed in interval arrangement at both side walls of the impinging stream mixing chamber;

an angle θ formed between each of the baffles and the side wall of the impinging stream mixing chamber is 20°-160°;

the internals or baffles in the impinging stream mixing chamber are fixed away from the central axes of the process fluid channels, and are not in the same horizontal planes with the central axes of the process fluid channels; the distance between the central axis of the process fluid channel and its neighboring baffle or internal is 50-800 μm;

a distance between two adjacent baffles or internals in the impinging stream mixing chamber is 50 μm-5 mm;

the baffles are installed in interval arrangement at both side walls of the fluid mixing intensification channel;

an angle φ formed between the baffle and the side wall of the fluid mixing intensification channel is 20°-160°;

a distance between two adjacent baffles or internals in the fluid mixing intensification channel is 50 μm-5 mm;

an outlet of each of the process fluid channels inside the impinging stream mixing chamber is tapered, and has a width of 1-500 μm;

the process fluid channels are symmetrically arranged on both sides of the impinging stream mixing chamber; and a distance between the two tapered outlets of two process fluid channels symmetrically arranged with respect to the impinging stream mixing chamber is 10-500 μm.

2. The micro-channel mixer of claim 1, wherein each of the two inlet channels has a rectangular cross section; each of the two inlet channels has a width of 50 μm-10 mm, a depth of 50 μm-10 mm and a length of 1-500 mm; and the two inlet channels are symmetrically arranged on both sides of the impinging stream mixing chamber.

3. The micro-channel mixer of claim 1, wherein a cross section of each of the process fluid channels is rectangular; and each of the process fluid channels has a width of 50-1000 μm, a depth of 50-1000 μm and a length of 1-200 mm.

4. The micro-channel mixer of claim 1, wherein a cross section of the impinging stream mixing chamber is rectangular; and the impinging stream mixing chamber has a width of 50 μm-10 mm, a depth of 50 μm-10 mm and a length of 1-500 mm.

5. The micro-channel mixer of claim 1, wherein a cross section of each process fluid channel is rectangular; and each process fluid channel has a width of 50 μm-10 mm, a depth of 50 μm-10 mm and a length of 1-1000 mm.

6. The micro-channel mixer of claim 4, wherein a height of the baffles or internals is equal to a depth of the impinging stream mixing chamber; a width of the baffles is 0.1-0.9 times that of the impinging stream mixing chamber; a length of the baffles is 0.1-2.0 times the width of the impinging stream mixing chamber; a width of the internals is 0.1-0.9 times that of the impinging stream mixing chamber; and a length of the internals is 0.1-2.0 times the width of the impinging stream mixing chamber.

7. The micro-channel mixer of claim 5, wherein a height of the baffles or internals is equal to a depth of the fluid mixing intensification channel; a width of the baffles is 0.1-0.9 times that of the fluid mixing intensification channel; a length of the baffles is 0.1-2.0 times the width of the fluid mixing intensification channel; a width of the internals is 0.1-0.9 times that of the fluid mixing intensification channel; and a length of the internals is 0.1-2.0 times the width of the fluid mixing intensification channel.

8. The micro-channel mixer of claim 1, wherein the internals in the impinging stream mixing chamber or the fluid mixing intensification channel are independently asterisk-shaped, X-shaped and Y-shaped.

9. A method of mixing fluids using the micro-channel mixer of claim 1, comprising:

simultaneously pumping two fluids into the two inlet fluid reservoirs, respectively;

allowing the two fluids to flow into the two groups of process fluid channels sequentially through the two inlet channels and the two groups of fluid distribution channel networks, respectively;

allowing the two fluids to flow into the impinging stream mixing chamber from the two groups of process fluid channels, respectively;

subjecting the two fluids to oppositely impinge upon each other to mix the two fluids to obtain a fluid mixture;

subjecting the fluid mixture to vortex or secondary flow generated by the baffles or internals to improve degree of mixing;

allowing the fluid mixture to flow into the fluid mixing intensification channel;

subjecting the fluid mixture to vortex or secondary flow generated by the baffles or internals to further intensify the flow disturbance of the fluid mixture and enhance the degree of mixing; and discharging the mixed fluid material through the outlet buffer reservoir.

10. The micro-channel mixer of claim 1, wherein the distance between two adjacent baffles or internals in the impinging stream mixing chamber is 50 μm-500 μm for a compact arrangement or 500 μm-5 mm for a loose arrangement.

11. The micro-channel mixer of claim 1, wherein the distance between two adjacent baffles or internals in the fluid mixing intensification channel is 50 μm-500 μm for a compact arrangement or 500 μm-5 mm for a loose arrangement.

* * * * *